United States Patent
Karikallio

(10) Patent No.: US 12,425,315 B2
(45) Date of Patent: Sep. 23, 2025

(54) METHOD FOR MONITORING NETWORK PERFORMANCE RELATING TO A SERVICE

(71) Applicant: Elisa Oyj, Helsinki (FI)

(72) Inventor: Henri Karikallio, Helsinki (FI)

(73) Assignee: Elisa Oyj, Helsinki (FI)

( * ) Notice: Subject to any disclaimer, the term of this patent is extended or adjusted under 35 U.S.C. 154(b) by 9 days.

(21) Appl. No.: 18/571,792

(22) PCT Filed: Jun. 8, 2022

(86) PCT No.: PCT/FI2022/050394
§ 371 (c)(1),
(2) Date: Dec. 19, 2023

(87) PCT Pub. No.: WO2022/269124
PCT Pub. Date: Dec. 29, 2022

(65) Prior Publication Data
US 2024/0223482 A1    Jul. 4, 2024

(30) Foreign Application Priority Data
Jun. 24, 2021   (FI) .................................. 20215749

(51) Int. Cl.
*H04L 43/04*    (2022.01)
*G06F 11/34*    (2006.01)
(Continued)

(52) U.S. Cl.
CPC ........ *H04L 43/04* (2013.01); *G06F 11/3409* (2013.01); *H04L 41/0677* (2013.01);
(Continued)

(58) Field of Classification Search
None
See application file for complete search history.

(56) References Cited

U.S. PATENT DOCUMENTS 10,552,249 B1 * 2/2020 Johansson ............. G06F 11/079
2008/0022336 A1 * 1/2008 Howcroft ............ H04L 12/2803
725/108

(Continued)

FOREIGN PATENT DOCUMENTS

CN    1275430 C    9/2006
EP    2979398 B1    8/2017
(Continued)

OTHER PUBLICATIONS

3GPP, 3rd Generation Partnership Project; Technical Specification Group Services and System Aspects; Management and orchestration; Study on enhancement of Management Data Analytics (MDA), TR 28.809 V17.0.0 (Mar. 2021).
(Continued)

*Primary Examiner* — Sandarva Khanal
(74) *Attorney, Agent, or Firm* — Espatent Oy

(57) ABSTRACT

Monitoring network performance relating to an application-level service used by a user by obtaining first monitoring data measuring performance of a home network (11) of the user concerning the application-level service and/or type of a device used by the user, obtaining second monitoring data measuring performance of an operator network (20-40) concerning said application-level service and/or type of a device used by said user, linking the first monitoring data with the second monitoring data so as to obtain combined application-level and/or device type-level monitoring data concerning said particular service used by said particular user, and storing said combined application-level and/or device type-level monitoring data at a data lake (72).

9 Claims, 3 Drawing Sheets

(51) Int. Cl.
  *H04L 41/0677* (2022.01)
  *H04L 41/0681* (2022.01)
  *H04W 24/08* (2009.01)
  *H04W 72/542* (2023.01)

(52) U.S. Cl.
  CPC ......... *H04L 41/0681* (2013.01); *H04W 24/08* (2013.01); *H04W 72/542* (2023.01)

(56) References Cited

U.S. PATENT DOCUMENTS

| | | | |
|---|---|---|---|
| 2008/0198754 A1* | 8/2008 | Savoor | H04L 43/50 370/245 |
| 2013/0137475 A1* | 5/2013 | Rousu | H04W 72/0453 455/509 |
| 2013/0198767 A1* | 8/2013 | Wang | H04N 21/6583 725/14 |
| 2013/0290525 A1* | 10/2013 | Fedor | H04L 41/147 709/224 |
| 2013/0297791 A1 | 11/2013 | Fallon et al. | |
| 2014/0122140 A1* | 5/2014 | Rijnders | G06Q 30/01 705/7.13 |
| 2014/0130111 A1* | 5/2014 | Nulty | H04N 21/6118 725/107 |
| 2014/0369208 A1* | 12/2014 | Voshi | H04L 12/2801 370/242 |
| 2016/0373944 A1 | 12/2016 | Jain et al. | |
| 2017/0012833 A1 | 1/2017 | Kumar et al. | |
| 2017/0373950 A1 | 12/2017 | Szilagyi et al. | |
| 2018/0288764 A1* | 10/2018 | Ramamurthi | H04W 24/08 |
| 2019/0354111 A1* | 11/2019 | Cheng | G05D 1/0011 |
| 2019/0372859 A1* | 12/2019 | Mermoud | H04L 41/28 |
| 2020/0007413 A1 | 1/2020 | Kerpez | |
| 2020/0044943 A1 | 2/2020 | Bor-Yaliniz et al. | |
| 2020/0205155 A1* | 6/2020 | Tumuluru | H04N 21/4331 |
| 2020/0259723 A1* | 8/2020 | Xue | H04L 43/0852 |
| 2020/0313985 A1* | 10/2020 | Jayakumar | H04L 41/149 |
| 2021/0385670 A1* | 12/2021 | Ronen | H04W 24/02 |

FOREIGN PATENT DOCUMENTS

| | | | | |
|---|---|---|---|---|
| EP | 3383088 A1 | * | 10/2018 | ............ H04W 24/02 |
| EP | 3817004 A1 | * | 5/2021 | ............ G16H 40/20 |
| KR | 100580107 B1 | | 5/2006 | |
| WO | WO-2018010824 A1 | * | 1/2018 | ............ G06F 16/345 |
| WO | WO-2020002772 A1 | * | 1/2020 | ............ G06N 20/00 |
| WO | 2020070739 A1 | | 4/2020 | |

OTHER PUBLICATIONS

ETSI, Experiential Networked Intelligence (ENI); ENI use cases, GS ENI 001 V3.1.1 (Dec. 2020).

* cited by examiner

METHOD FOR MONITORING NETWORK PERFORMANCE RELATING TO A SERVICE

TECHNICAL FIELD

The present disclosure generally relates to performance analysis of communication networks. The disclosure relates particularly, though not exclusively, to a method for monitoring performance of a service from a user point of view.

BACKGROUND

This section illustrates useful background information without admission of any technique described herein representative of the state of the art.

Network operators provide customers (or users) with a plurality of different ways to connect to the Internet. For example, the users may connect via a mobile router, a cable modem or via an xDSL modem. The data rates achieved by each alternative vary, inter alia, depending on geographic location and the connection type.

From the point of view of users, an internet connection is typically fast enough if the services used by the users function as intended without noticeable delays. In online gaming services, lag is a noticeable delay between the action of players and the reaction from the server supporting the game. The player's ability to tolerate lag depends on the type of game being played. In streaming services, users are typically satisfied if the content that is being streamed from a streaming server shows on the screen without constant buffering.

There are many reasons why an Internet connection might appear slow. There might be a problem in a modem or router, Wi-Fi signal, signal strength on a cable line, etc.

Now a new approach for monitoring network performance relating to a service is provided.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

A method for monitoring performance of a service from a user point of view is provided.

According to a first example aspect of the present invention, there is provided a computer implemented method for monitoring network performance relating to an application-level service used by a user, the method comprising:
  obtaining first monitoring data measuring performance of a home network of the user concerning the application-level service and/or type of a device used by the user;
  obtaining second monitoring data measuring performance of an operator network concerning said application-level service and/or type of a device used by said user;
  linking the first monitoring data with the second monitoring data so as to obtain combined application-level and/or device type-level monitoring data concerning said particular service used by said (particular) user; and
  storing said combined application-level and/or device type-level monitoring data into a data lake (or a memory).

In certain embodiments, the method comprises:
  obtaining, while the application-level service is ongoing, first monitoring data, such as key performance indicators, KPI, originating from a home network of the user and measuring performance of the home network of the user concerning the application-level service and/or type of a device used by the user, and associated data originating from the home network, wherein the associated data comprises information identifying a device or devices within the home network and said application-level service.

Examples of application-level services are for example a live streaming service, an online gaming service, and an audiobook service, etc. Examples of device types (or communication device types) are for example time-critical devices and non time-critical devices. Time-critical devices in this context are devices requiring immediate processing of data or immediate data transfer, for example, digital set top boxes that use video streaming etc. Non time-critical devices include devices that tolerate varying delays in communication, such as a robot vacuum cleaner, etc.

In certain embodiments, the method comprises:
  receiving an indication of inferior performance of said application-level service concerning said user (originating from the home network of the user); and
  determining, based on said application-level monitoring data and/or device type-level, a location in network causing said inferior performance.

In certain embodiments, the method comprises:
  causing action in said home network of said user in the event said determined location in network is the home network of said user; and
  causing action in said operator network in the event said determined location in network is the operator network.

In certain embodiments, the home network is a local network, for example a wireless local area network, at a home of the user (or individual). In certain embodiments, the home network is provided with the aid of a device, such as a modem or router, supplied by the operator. The operator herein means a network operator. In certain embodiments, the operator network is an access network providing access to the Internet (an Internet access network). The operator network is administered by the operator. In certain embodiments, the access network comprises different parts, for example, a radio access network and a core network in the case of a cellular access network.

In certain embodiments, said causing action in said operator network comprises causing a boot of a network device within said operator network.

In certain embodiments, said causing action in said home network comprises causing a concerned communication device of said user in said home network to switch from a frequency band of a wireless local area network to another frequency band of the wireless local area network.

In certain embodiments, the method comprises:
  providing output information indicating that the inferior performance is caused from elsewhere in the event it is determined that the location causing said inferior performance is neither said home network nor said operator network. In certain embodiments, in such a case, the problem causing the inferior performance is concluded to be due to an operator-independent reason, e.g., due to congestion within the Internet.

In certain embodiments, the method comprises:
  linking the first monitoring data with the second monitoring data by an identifier or a set of identifiers linking both a concerned communication device of said user in said home network and said application-level service used in said particular communication device with protocol data units of an underlying protocol stack.

In certain embodiments, the method comprises:
providing a real-time or near real-time end-to-end performance monitoring based on the application-level service in use by the user or based on the device type.

Herein, the real-time monitoring refers to continual input, constant processing, and steady output of data. The near real-time monitoring refers to processing where speed is still important, but processing time in minutes is acceptable instead of seconds.

In certain embodiments, the method comprises:
providing an indicator to be monitored based on the device type.

In certain embodiments, the method comprises contacting the user or indicating a need for a service visit (on site) based on an anomaly detected by said monitoring.

According to a second example aspect of the present invention, there is provided an apparatus, comprising:
a processor; and
a memory including a data lake and computer program code, the memory and the computer program code being configured, with the processor, to cause the apparatus to perform the method of the first aspect or any related embodiment.

According to a third example aspect of the present invention, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of the first aspect or any related embodiment.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

Figure 1:
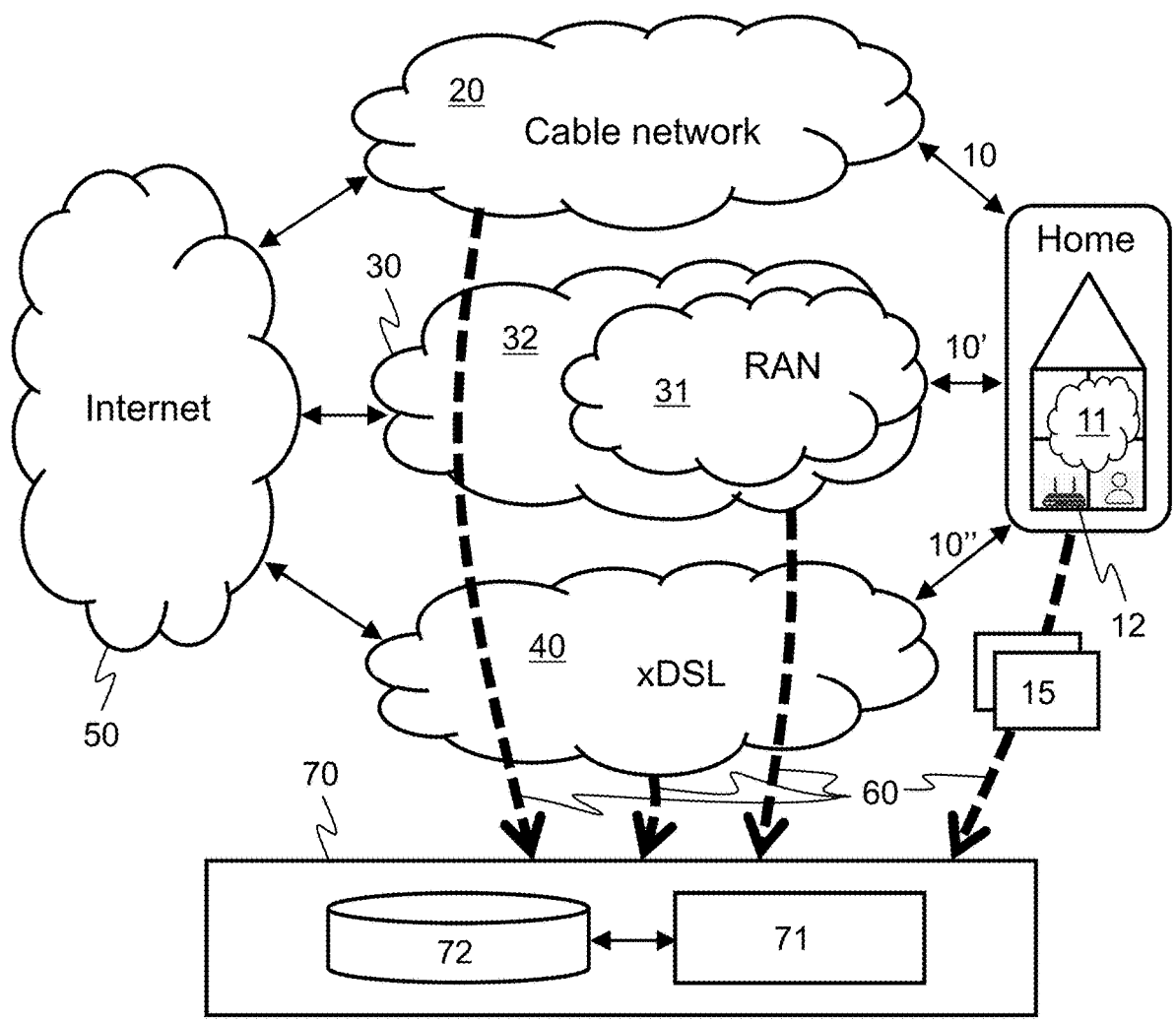
FIG. 1 schematically shows a network architecture according to an example embodiment.

FIG. 1 shows schematically shows a network architecture of a communication system according to an example embodiment. A network operator provides a plurality of access networks that provide an access from a user's home network 11 to the Internet 50. In the example architecture shown in FIG. 1 these include a cable Internet access network (or cable television network) 20, a cellular access network 30 and an xDSL (such as ADSL or VDSL) network 40. The network operator provides the user with an access device 12 which may be a cable modem, a mobile router, or an xDSL modem router or similar depending on the access network type. The access device 12 is administered by the operator meaning that the operator provides updates to the access device 12 and is allowed to obtain monitoring data from the access device 12.

The reference numerals 10, 10' and 10" denote connections between the home network 11 and the respective access networks 20, 30, and 40 that provide the user with an Internet access. The connections are enabled by a respective access device 12 positioned at the user's home. The network topology of each of the access networks is known as such. The access networks are operator networks administered by the operator. In certain embodiments, the access networks comprise different parts, for example, a radio access network 31 and a core network 32 in the case of a cellular access network 30.

In certain embodiments, a system architecture of the shown type implements a method for monitoring network performance relating to an application-level service used by a user (or an individual). Examples of application-level services are for example a live streaming service, an online gaming service, and an audiobook service.

The method comprises obtaining first monitoring data measuring performance of the home network 11 concerning the application-level service used by the user. In practice, while the application-level service is ongoing, an automated system 70 within an operator domain receives key performance indicators (KPI) and associated data originated from the home network 11 and sent by or via the access device 12. The KPIs comprise various data indicating the performance of the home network 11, such as signal strength indicators, delays, etc. The associated data links the KPIs with a particular user device and with the particular application-level service that is being used by the user. The associated data comprises information identifying a device or devices within the home network 11 and said application-level service. For example, a MAC (medium access control) address is used in certain embodiments to identify a user device in an underlying protocol stack. The application-lever service is identified by an appropriate application identifier depending on the embodiment.

The transmission path for obtaining the first monitoring data depends on the implementation. In certain embodiments, an operator-controlled auto configuration server (ACS) 15 (or a user services platform, USP) is used as an intermediate unit to forward (and request in certain embodiments) the first configuration data from the home network 11. In certain embodiments, the first monitoring data is routed via the access network in question.

The automated system 70 comprises a processor 71 and a memory 72. The memory 72 comprises a big storage, a data lake, which contains enough space for storing loads of monitoring data received from different networks.

The processor 71 stores the first monitoring data into the data lake 72.

The method further comprises obtaining second monitoring data measuring performance of an operator network concerning said application-level service used by said user. The operator network herein means the access network 20-40 used by the particular application-level service of the particular user (or user device). In practice, while the application-level service is ongoing in the user device, the automated system 70 receives key performance indicators (KPI) and associated data from the access network 20-40 in use. The KPIs comprise various data indicating the performance of various elements of the concerned access network 20-40, such as signal strength indicators, delays, etc. The associated data links the KPIs with a particular user device and with the particular application-level service that is being used by the user. Accordingly, the associated data identifies a concerned data stream between the home network 11 of the particular user and the Internet. The associated data therefore provides a link between the data stream of the application-level service of the particular user and protocol data units transmitted within the concerned access network 20-40. For example, a MAC (medium access control) address is used in certain embodiments to identify a user device in an underlying protocol stack. The application-level service is identified by an appropriate application identifier depending on the embodiment.

The processor 71 stores the second monitoring data into the data lake 72.

The automated system 70 now comprises both the first monitoring data and the second monitoring data linked together by said particular application-level service of said particular user and stored into the data lake 72 (the dashed lines 60 indicate collection of monitoring data from various parts of the communication system).

Providing both the first monitoring data and the second monitoring data linked together enables an end-to-end performance monitoring of the application-level service concerning a specified user. The expression end-to-end herein means end-to-end from the point of view of the network operator. Accordingly, end-to-end herein means a transmission path extending through all parts of the network over which the operator has control, i.e., from the home network 11 to a border of the Internet in certain embodiments.

Figure 2:
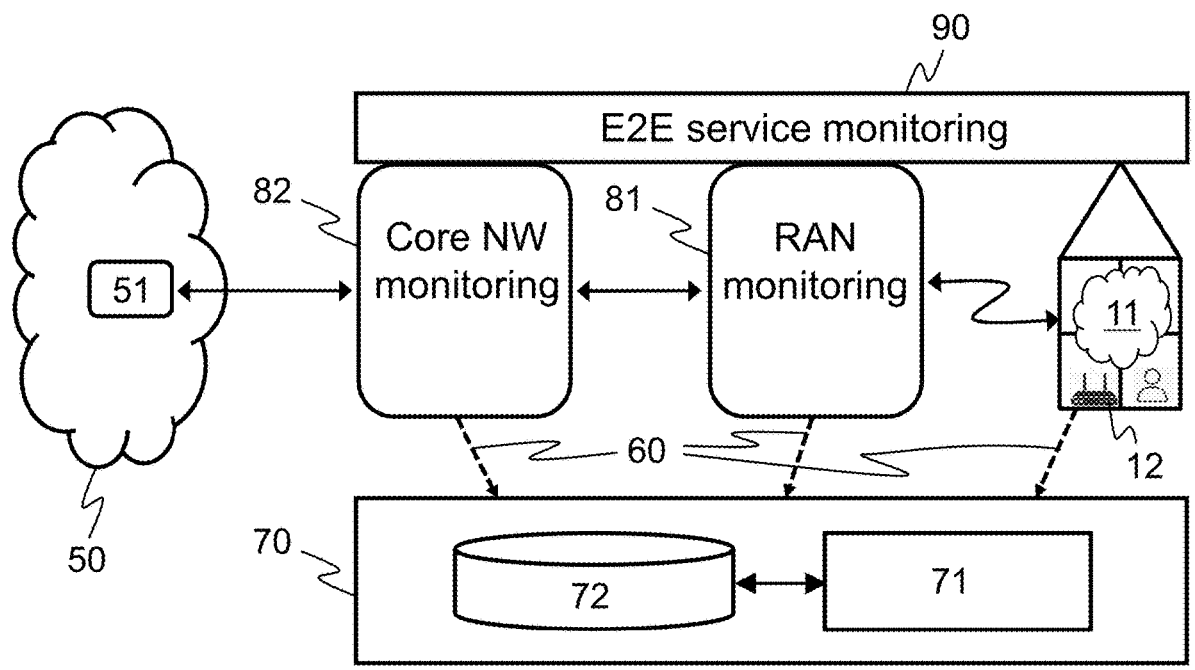
FIG. 2 shows the principle of collecting monitoring data according to an example embodiment.

FIG. 2 shows the principle of collecting monitoring data according to an example embodiment in a cellular access network case. The user has a session (e.g. a video streaming session) with a service provider's server 51 in the Internet 50. First monitoring data is collected from the home network 11, linked to the user device and the application-level service (here: video streaming application/service).

Second monitoring data is collected from each involved part in the operator network (cellular access network). In particular, a radio access network (RAN) monitoring function 81 provides the automated system 70 with second monitoring data concerning elements within the RAN, and a core network monitoring function provides the automated system 70 with second monitoring data concerning elements within the cellular core network.

The end-to-end performance monitoring based on the application-level service and a specified individual user is seen in an embodiment as a common functional layer 90 on top of and combining various separate performance monitoring functions.

Figure 3:
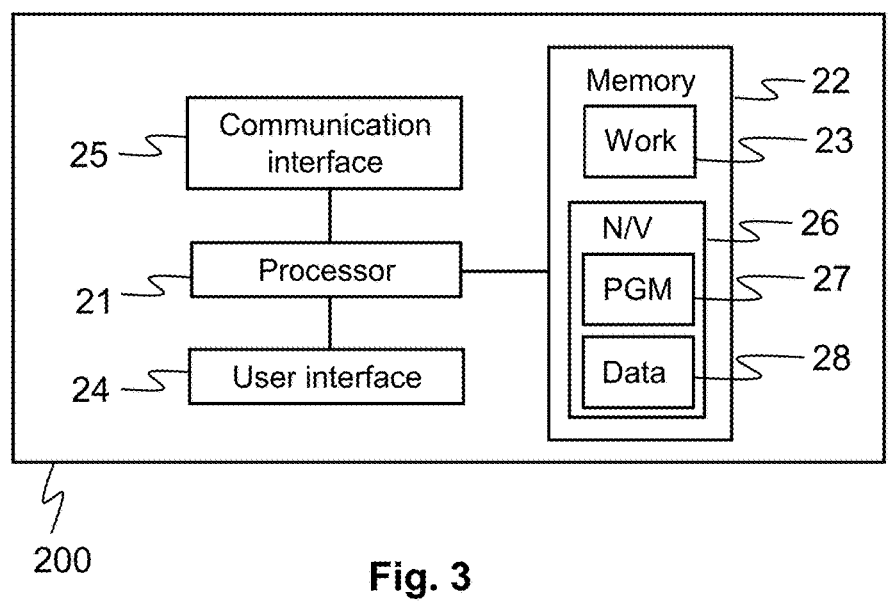
FIG. 3 shows a block diagram of an apparatus according to an example embodiment.

FIG. 3 shows a block diagram of an apparatus 200 according to an embodiment. The apparatus 200 is for example a general-purpose computer or server or some other electronic data processing apparatus. The apparatus 200 can be used for implementing at least some embodiments of the invention. That is, with suitable configuration the apparatus 200 is suited for operating for example as the automated system 70.

The apparatus 200 comprises a communication interface 25, a processor 21, a user interface 24, and a memory 22.

The communication interface 25 comprises in an embodiment a wired and/or wireless communication circuitry, such as Ethernet, Wireless LAN, Bluetooth, GSM, CDMA, WCDMA, LTE, and/or 5G circuitry. The communication interface can be integrated in the apparatus 200 or provided as a part of an adapter, card or the like, that is attachable to the apparatus 200. The communication interface 25 may support one or more different communication technologies. The apparatus 200 may also or alternatively comprise more than one communication interface 25.

The processor 21 may be a central processing unit (CPU), a microprocessor, a digital signal processor (DSP), a graphics processing unit, an application specific integrated circuit (ASIC), a field programmable gate array, a microcontroller or a combination of such elements.

The user interface 24 may comprise a circuitry for receiving input from a user of the apparatus 200, e.g., via a keyboard, graphical user interface shown on the display of the apparatus 200, speech recognition circuitry, or an accessory device, such as a headset, and for providing output to the user via, e.g., a graphical user interface or a loudspeaker.

The memory 22 comprises a work memory 23 and a persistent (non-volatile, NN) memory 26 configured to store computer program code 27 and data 28. The memory 26 may comprise any one or more of: a read-only memory (ROM), a programmable read-only memory (PROM), an erasable programmable read-only memory (EPROM), a random-access memory (RAM), a flash memory, a data disk, an optical storage, a magnetic storage, a smart card, a solid state drive (SSD), or the like.

The apparatus 200 may comprise a plurality of memories 26. The memory 26 may be constructed as a part of the apparatus 200 or as an attachment to be inserted into a slot, port, or the like of the apparatus 200 by a user or by another person or by a robot. The memory 26 may serve the sole purpose of storing data, or be constructed as a part of an apparatus 200 serving other purposes, such as processing data.

As to the automated system 70, the data lake 72 may be implemented in the memory 26 in certain embodiments. And, the processor 71 may be implemented with the processor 21.

A skilled person appreciates that in addition to the elements shown in FIG. 3, the apparatus 200 may comprise other elements, such as microphones, displays, as well as additional circuitry such as an input/output (I/O) circuitry, memory chips, application-specific integrated circuits (ASIC), a processing circuitry for specific purposes such as a source coding/decoding circuitry, a channel coding/decoding circuitry, a ciphering/deciphering circuitry, and the like.

Additionally, the apparatus 200 may comprise a disposable or rechargeable battery (not shown) for powering the apparatus 200 when external power if external power supply is not available.

Further, it is noted that only one apparatus is shown in FIG. 3, but embodiments of the invention may equally be implemented in a cluster of shown apparatuses.

Figure 4:
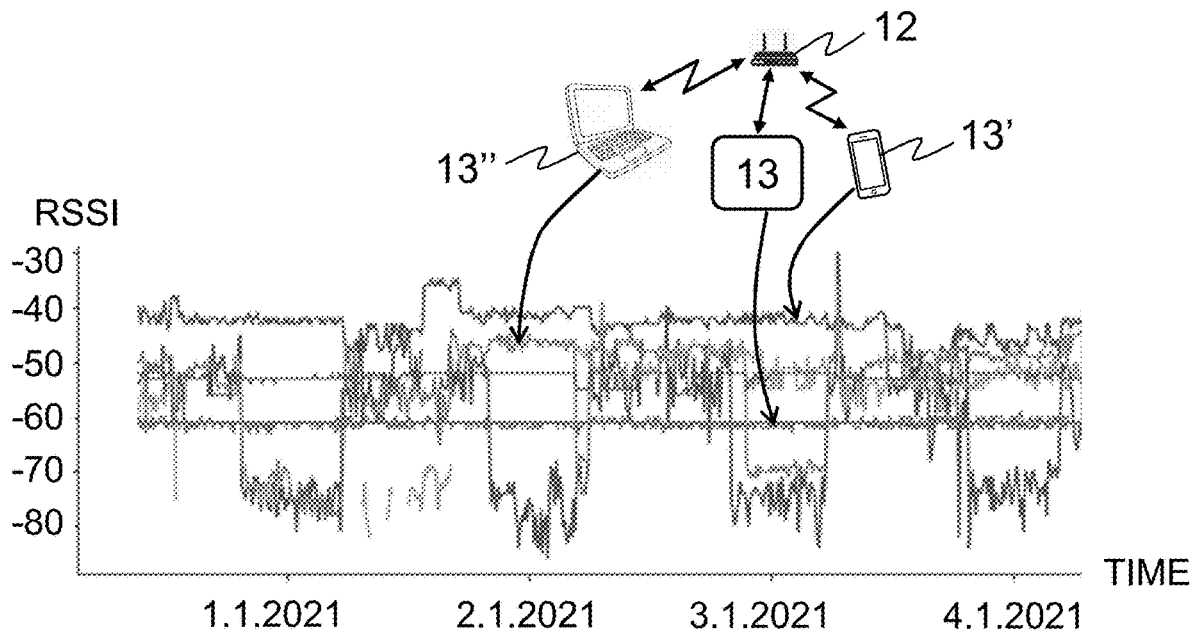
FIG. 4 shows examples of received signal strengths measured by certain devices within a home network.

FIG. 4 shows examples of received signal strengths versus time as measured by certain devices within a home network 11. These received signal strengths, e.g. expressed as RSSI (Received Signal Strength Indicator) values, present examples of KPIs that are included into the first monitoring data. The home network 11 typically comprises a plurality of devices 13 connected to the access device or router 12. Some of these devices may be supplied by the operator, such as set-top boxes providing an entertainment service, known for example as Elisa Viihde, and some other devices are user devices connected to the device 12 either wirelessly or by a connecting cable. As an example, FIG. 4 shows a mobile phone or terminal 13' in wireless communication (e.g. WLAN connection) with the device 12, a laptop computer 13" in wireless communication (e.g. WLAN connection) with the device 12 and a further device, such as a TV or a home security system or a robot vacuum cleaner device 13 connected with a cable to the device 12. It can be observed that the RSSI values are different for each device and they vary over time.

In certain embodiments, an indication of inferior performance of the application-level service concerning a user is received by the automated system 70. In certain embodiments, the indication is automatically obtained within the received KPIs linked to the user and application-level service. In other embodiments, the user contacts the operator by manual or automatic means, for example by contacting a customer service of the operator (by a phone call, by sending chat or email, or by reporting an error in an automatic feedback system provided by the operator).

In response to receiving the indication (either directly or indirectly), the automated system 70 determines, based on the stored application-level monitoring data, a location in network causing said inferior performance.

Next, the automated system 70 causes action in said home network 11 of said user in the event said determined location in network is the home network 11 of said user and causes action in said operator network in the event said determined location in network is the operator network.

In certain embodiments, said causing action in said home network 11 comprises causing a concerned communication device 13,13',13" of said user in said home network 11 to switch from a frequency band of a wireless local area network to another frequency band of the wireless local area network. In certain embodiments, this kind of operation is implemented by sending a control message from the automated system 70 to the access device 12.

In certain embodiments, said causing action in said operator network comprises causing a boot of the network device (causing a problem) within said operator network.

In certain embodiments, output information is provided indicating that the inferior performance is caused from elsewhere in the event it is determined that the location causing said inferior performance is neither said home network 11 nor said operator network 20-40. In certain embodiments, in such a case, the problem causing the inferior performance is concluded to be due to an operator-independent reason, e.g., due to congestion within the Internet.

Figure 5A:
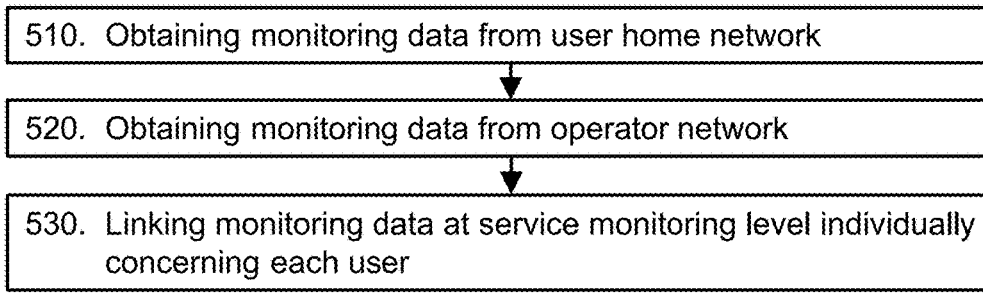
FIG. 5A shows a flow chart according to an example embodiment.

FIG. 5A shows a flow chart according to an example embodiment. In phase 510, first monitoring data is obtained from user home network. In phase 520, second monitoring data is obtained from operator network, and in phase 530, the first and second monitoring data are linked at application service monitoring level individually concerning each user.

Figure 5B:
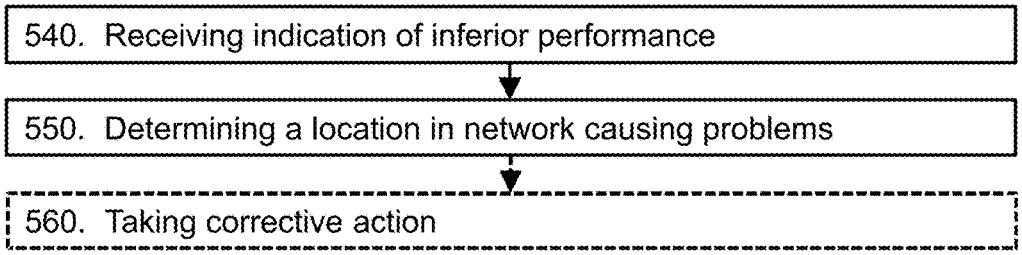
FIG. 5B shows a flow chart according to another example embodiment.

FIG. 5B shows a flow chart according to another example embodiment. In phase 540, which may be a direct continuation of phase 530 (FIG. 5A), an indication of inferior performance of an application-level service is obtained. In phase 550, it is determined whether the home network 11, the involved access network 20-40 or an operator-independent location causes said inferior performance. In an optional phase 560, corrective action is taken.

Various embodiments have been presented. The embodiments enable network performance monitoring based on monitoring the performance of an application used by an individual user. If a reported problem in network performance is an operator-independent problem, this can be concluded and excluded when determining a cause to the problem. Every anomaly in the performance of the service used by the user can be located within the used networks.

The preceding disclosure in the detailed description has been concentrated on monitoring based on the application-level service. In addition to, or instead of, what has been described concerning monitoring based on the application-level service also applies to monitoring based on a device type of the user.

In certain embodiments, a real-time or near real-time end-to-end performance monitoring based on the application-level service in use by the user or based on the device type is provided. And, in certain embodiments, an indicator to be monitored based on the device type is provided.

In certain embodiments, a need to contact the user or a need for a service visit (on site) is indicated based on an irregularity detected by said monitoring.

As an example of a use scenario, a real-time or near real-time monitoring is set up for time-critical applications and/or devices and/or protocols that require more bandwidth/less delays, etc.

On the other hand, non time-critical devices will sometimes also experience performance problems in communication. Accordingly, monitoring with less critical indicators is set up for those devices/device types. For example, a robot vacuum cleaner might not require any particular action if it does have access to a service all the time, but errors may accumulate and require corrective action, which will be detected based on monitoring, in the long run.

When resolving a MAC address, or similar, it is possible to identify the vendor of the device in question, the type of the device based on the vendor, the model of the device in some events, etc. In certain embodiments, once the device or its type is identified, based on the MAC address, or based on other applicable identification information, a suitable indicator to be monitored is selected for that device or device type.

The following presents one example of the preceding:

NETGEM=device providing an entertainment service→near real-time service→near real-time monitoring→monitored (KPI) indicator: errors per second; measured at minute level OR number of transmitted packets second, measured at minute level;

IROBOT=robot vacuum cleaner→non time-critical→monitored (KPI) indicator: errors per hour; measured at day-level OR signal strength per hour; measured at day-level.

Without limiting the scope and interpretation of the patent claims, certain technical effects of one or more of the example embodiments disclosed herein are listed in the following. A technical effect is providing an end-to-end monitoring of the performance of an application-level service concerning a specified user or individual. Another technical effect is enabling corrective action to be taken in a centralized manner.

It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer implemented method for monitoring network performance relating to an application-level service used by a user, the method comprising:
    obtaining, while the application-level service is ongoing, first monitoring data originating from a home network of the user and measuring performance of the home network of the user concerning the application-level service and/or type of a device used by the user, and associated data originating from the home network, wherein the associated data comprises information identifying a device or devices within the home network and said application-level service, wherein the home network is a local network;
    obtaining second monitoring data measuring performance of an operator network concerning said application-level service and/or type of a device used by said user, wherein the operator network is a cellular access network providing access to internet;
    linking the first monitoring data with the second monitoring data so as to obtain combined application-level and/or device type-level monitoring data concerning the application-level service used by said user;
    storing said combined application-level and/or device type-level monitoring data into a data lake, wherein the method comprises:
    receiving an indication of inferior performance of said application-level service concerning said user originating from the home network of the user;
    determining, based on said combined application-level and/or device type-level monitoring data, a location in network causing said inferior performance,
    providing a real-time or near real-time end-to-end performance monitoring based on the application-level service in use by the user or based on the type of the device;
    causing action in said home network of said user in an event it is determined that the location in network causing said inferior performance is the home network of said user; and
    causing action in said operator network in an event it is determined that the location in network causing said inferior performance is the operator network,
    wherein said causing action in said operator network comprises causing a boot of a network device within said operator network.

2. The computer implemented method of claim 1, wherein said causing action in said home network comprises causing a concerned communication device of said user in said home network to switch from a frequency band of a wireless local area network to another frequency band of the wireless local area network.

3. The computer implemented method of claim 2, comprising:
    linking the first monitoring data with the second monitoring data by an identifier or a set of identifiers linking both a concerned communication device of said user in said home network and said application-level service used in said concerned communication device with protocol data units of an underlying protocol stack.

4. The computer implemented method of claim 1, comprising:
    providing output information indicating that the inferior performance is caused from elsewhere in an event it is determined that the location causing said inferior performance is neither said home network nor said operator network.

5. The computer implemented method of claim 4, comprising:
    linking the first monitoring data with the second monitoring data by an identifier or a set of identifiers linking both a concerned communication device of said user in said home network and said application-level service used in said concerned communication device with protocol data units of an underlying protocol stack.

6. The computer implemented method of claim 1, comprising:
    linking the first monitoring data with the second monitoring data by an identifier or a set of identifiers linking both a concerned communication device of said user in said home network and said application-level service used in said concerned communication device with protocol data units of an underlying protocol stack.

7. The computer implemented method of claim 1, comprising:
    providing an indicator to be monitored based on the type of the device.

8. An apparatus comprising:
    a processor; and
    a memory including a data lake and computer program code, the memory and the computer program code being configured, with the processor, to cause the apparatus to perform the method of claim 1.

9. A non-transitory computer readable medium, having stored thereon a computer program comprising computer executable program code which when executed by a processor causes an apparatus to perform the method of claim 1.

* * * * *